United States Patent [19]

Mohr et al.

[11] Patent Number: 4,774,426
[45] Date of Patent: Sep. 27, 1988

[54] COMMUTATOR MACHINE HAVING A PERMANENT MAGNET STATOR

[75] Inventors: Adolf Mohr, Bühlertal; Bernd Wieland, Gaggenau, both of Fed. Rep. of Germany

[73] Assignee: Robert Bosch GmbH, Stuttgart, Fed. Rep. of Germany

[21] Appl. No.: 41,105

[22] PCT Filed: Mar. 14, 1986

[86] PCT No.: PCT/DE86/00112
§ 371 Date: Mar. 3, 1987
§ 102(e) Date: Mar. 3, 1987

[87] PCT Pub. No.: WO87/00361
PCT Pub. Date: Jan. 15, 1987

[30] Foreign Application Priority Data

Jul. 3, 1985 [DE] Fed. Rep. of Germany ....... 3523755

[51] Int. Cl.[4] ............................................ H02K 21/30
[52] U.S. Cl. ...................... 310/154; 310/177
[58] Field of Search .................. 310/154, 67 R, 152, 310/177

[56] References Cited

U.S. PATENT DOCUMENTS 3,083,310  3/1963  Tweedy et al. ............ 310/154
4,082,968  4/1978  Jones ............................ 310/154
4,454,437  6/1984  Tanaka et al. .............. 310/154

FOREIGN PATENT DOCUMENTS 1369107  6/1964  France .
2407598  5/1979  France .
2337852  6/1974  Fed. Rep. of Germany .
2550416  5/1977  Fed. Rep. of Germany .

OTHER PUBLICATIONS van Heffen, "Ceramic Permanent Magnets for d.c. Motors, Electronic Components to Application, vol. 3, No. 2, Feb. 81, pp. 120-126.

Primary Examiner—Patrick R. Salce
Assistant Examiner—D. L. Rebsch
Attorney, Agent, or Firm—Walter Ottesen

[57] ABSTRACT

A commutator machine, in particular a small direct-current motor, has at least one pair of permanent magnets (11) retained on a magnetic short-circuit element (10), the permanent magnets being of a single-substance ferrite material or a multi-substance material having portions of high coercivity and high remanence along the periphery of an armature (15) rotating inside the stator (12). By selecting suitable ferrite materials, depending on the required excitation field intensity or the required demagnetization stability, and by the proposed dimensioning of armature diameter ($d_A$), magnet thickness ($D_M$) and thickness of the short-circuit element ($D_R$), an optimal configuration of the motor is obtained by attaining the maximum possible capacity with the lowest possible weight.

5 Claims, 3 Drawing Sheets

COMMUTATOR MACHINE HAVING A PERMANENT MAGNET STATOR

BACKGROUND OF THE INVENTION

The invention relates to a commutator machine such as a small direct-current motor. A machine of this kind, in particular a small direct-current motor, is known from DE-OS No. 28 45 264 or from DE-PT No. 31 19 782. In these machines there was a limit as to how much the various machine dimensions could be varied, in particular because of the demagnetization stability of the ferrite material used, and there was a tendency, with increasing motor size, to provide a percentage increase in the armature diameter as well, while reducing the optimal magnet heights by a percentage. Known calculation methods for such permanent-magnet-excited commutator machines allowed optimizing production costs on the one hand, and weight per unit of power on the other, only within narrow limits.

SUMMARY OF THE INVENTION

The commutator machine according to the invention affords the advantage with respect to the foregoing in that a machine configuration was found utilizing a particular ferrite magnetic material which permits an especially advantageous match of the armature cross field and the exciter field and affords a favorable utilization of the volume of the machine. The ferrite magnetic material is variable in wide limits with reference to remanence and coercive field intensity.

The thickness of the magnets used is suitably selected to be constant over the length, that is over the circular segment, except for the tapering ends of the magnets.

BRIEF DESCRIPTION OF THE DRAWING

An embodiment of the invention is shown in the drawing and explained in further detail in the following description.

DESCRIPTION OF THE PREFERRED EMBODIMENTS OF THE INVENTION

Figure 1:
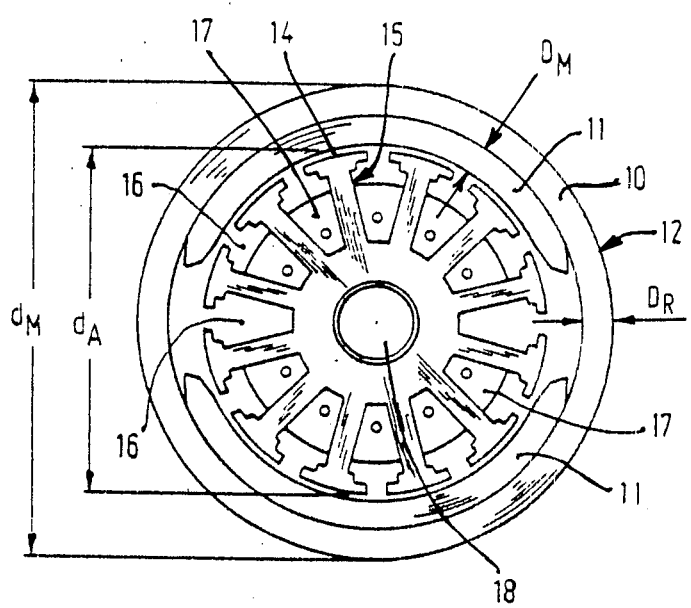
FIG. 1 shows a cross section through a commutator machine according to the invention, FIG. 2 a $B_r/_jH_C$ diagram of the permanent magnetic ferrite materials used, and FIG. 3 a diagram of the $Br/_jH_C$ values in dependence upon various $Al_2O_3$ additives.

FIG. 1 shows a cross section through a small direct-current motor having a short-circuit element 10, which together with permanent magnets 11 secured therein forms the stator 12 of the commutator machine. An armature 15 is rotatably mounted inside the stator 12, leaving an air gap 14, and an armature winding 17 is placed in the slots 16 of the armature. The armature 15 is held rotatably on a shaft 18.

Figure 2:
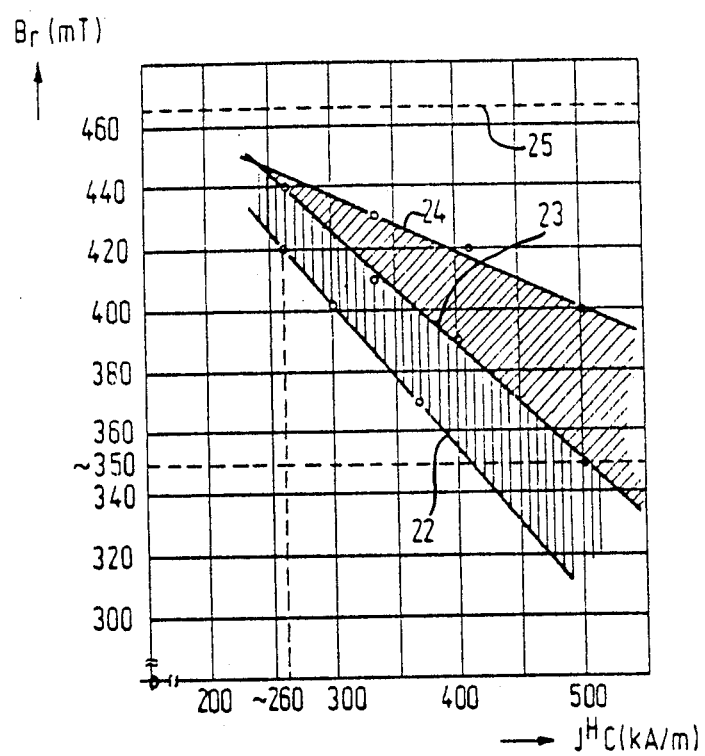

FIG. 2, in the form of a diagram, shows the dependency between remanence ($B_r$) and coercive field intensity $_jH_C$ for various ferrite materials. A lower line 22 marks the state of development in 1982; a middle line 23 shows the state of development of single-substance ferrite magnets in 1985; and an upper line 24 shows the presently attainable limit in multi-substance ferrite magnets. A further limit line 25 shows the theoretically attainable limit at a remanence $B_r$ of 465 mT.

Figure 3:
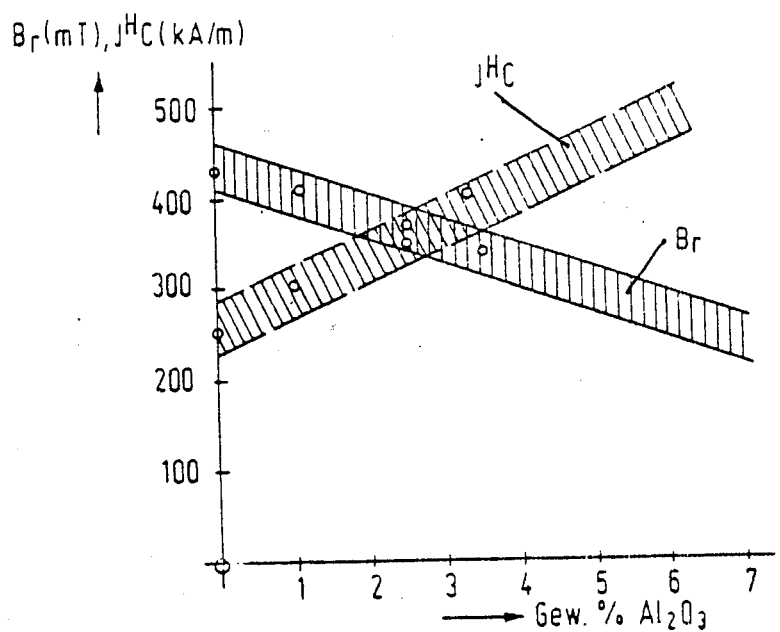

FIG. 3 shows the dependency of the $B_r$ and $_jH_C$ values of permanent magnets on the addition of various amounts of $Al_2O_3$. The shaded areas are due to the deviations that arise in the magnetic values; the decrease in the $B_r$ value and the increase in the $_jH_C$ value when an increasing amount of $Al_2O_3$ is added to the ferrite powder is clearly recognizable.

For various magnetic materials the following pairs of values occur:

|  | $B_r$(mT) | $_jH_C$(kA/m) |
| --- | --- | --- |
| Material "440" | 440 | 280 |
| Material "420" | 420 | 320 |
| Material "390" | 390 | 360 |
| Material "340" | 340 | 480 |

The values of the $Al_2O_3$ additives are as a rule between 0 and 6% by weight.

In addition to the coercive field intensity $_jH_C$, the limiting field intensity $H_G$, in particular, is critical for the design of commutator machines with permanent magnet excitation; the limiting field intensity is that up to which a permanent magnet is stable. The values for the remanence and for the limiting field intensity of a ferrite magnetic material can be varied within a wide range by the addition of aluminum oxide, as the curves in FIGS. 2 and 3 show. Depending on whether a higher remanence or a higher limiting field intensity is sought, it is possible to vary the properties of the ferrite magnetic material along the solid lines shown in FIG. 2 by adding aluminum oxide. With increasing values for the limiting field intensity, the value for the remanence decreases. In the diagram of FIG. 2, the middle line 23 corresponds to the state attained at the present time for a single-substance magnet; the upper line 24 applies to a two-substance magnet. The term "two-substance magnet" is understood to mean a permanent magnet comprising two different ferrite materials along the circumference of the armature 15, one of which materials has the higher coercive field intensity and the other the higher remanence; this subject matter is explained at length in the references cited above as prior art.

Since in a permanent magnet motor the armature cross field acts in a demagnetizing manner only on the trailing edge of the magnet segment 11, decreases approximately linearly toward the center of the magnet, and in the leading half of the magnet segment acts in a magnetizing manner, the requirement for stability of the permanent magnet must be met only on the trailing edge of the magnet. On this side of the permanent magnet 11, a minimum magnet thickness $D_M$ and a minimum limiting field intensity $H_G$ must accordingly be attained. Further important dimensions shown in FIG. 1 are the outside diameter $d_M$ of the machine, the armature diameter $d_A$, the magnet thickness $D_M$ and the thickness of the short-circuit element $D_R$.

If the magnet thickness $D_M$ is selected to be smaller, then the limiting field intensity value of the magnetic material must be increased, so as to compensate for the lesser magnet thickness. This leads to a simultaneous reduction of the remanence value. The cross field also increases because of the lesser thickness of the magnet, which leads to a further decrease in flux. On the other hand, however, if the outside diameter $d_M$ is constant, then the armature diameter $d_A$ of the machine can be increased. From this, a maximum value for the torque in proportion to the motor volume can be derived, without there being perceptible saturation influences.

Taking saturation into account, the armature cross field is decreased. As a result, only a lesser limiting field intensity $H_G$ is now required, so that a greater remanence value $B_r$ is attainable, in accordance with the characteristic curves in FIG. 2. This compensates for the influence of saturation, which of course is operative in the exciter circuit as well.

If the permanent magnets 11 are made thinner, then the exciter flux decreases as does the saturation effect. If the magnet thickness $D_M$ is too slight, the exciter flux becomes so low that the required torque can be attained only with the application of a large armature current, which usually causes impermissible heating of the machine. If the selected magnet thickness $D_M$ is made too great, then although the armature cross field is greatly suppressed and a magnetic material having a lower limiting field intensity and higher remanence can be used and a flux increase can be attained by means of the small shearing action; on the other hand, the diameter of the armature 15 then becomes so small that the increased flux value is poorly utilized as a result of saturation phenomena in the armature 15, which in turn leads to a reduction in the attainable torque for the same motor volume.

FIG. 1 shows an embodiment of the structure according to the invention of a small direct-current motor. For this structure having an outer diameter $d_M \leq 120$ mm, the following two-pole embodiments are realized:

|   | Armature diameter $d_A$ | Magnet thickness $D_M$ | $\dfrac{d_A}{p \cdot D_M}$ |
|---|---|---|---|
| 1. | 24   | 2.7–3.0 | 8.88–8.0 |
| 2. | 33.3 | 3.7–4.0 | 9.0–8.3 |
| 3. | 42   | 4.6–4.9 | 9.1–8.5 |
| 4. | 52   | 5.2–5.5 | 10–9.45 |
| 5. | 65   | 7.7–8.0 | 8.44–8.12 |

From FIG. 2, the change of the remanence ($B_r$) and of the coercive field intensity ($_JH_C$) (or the limiting field intensity ($H_G$)) is apparent for the various ferrite magnetic materials to which various amounts of aluminum oxide have been added.

For example, a ferrite material according to characteristic curve 22 can be changed by the addition of aluminum oxide such that, from a $B_r/_JH_C$ ratio of 420 mT/260 kA/m, a ratio of, for example, 330 mT/450 kA/m results. Newer single-substance ferrite materials behave approximately in accordance with the middle characteristic curve 23 with markedly higher remanence values resulting at the same coercive field intensity or limiting field intensity. Various specialized material values have already been explained above in connection with FIG. 3.

Still more favorable values can be attained, with the same machines, using so-called two-component magnets 11, which in the region of the greatest demagnetization by the armature cross field comprise a material having high coercivity and otherwise comprise a material having high remanence. The upper characteristic curve 24 corresponds to these two-component ferrite magnets 11. For the sake of clarity, reference numeral 25 indicates the theoretically attainable limit. In the field of small direct-current motors, it is suitable, for windshield wiper motors, to select permanent magnets 11 having high remanence and low coercive field intensity, while for blower motors, magnets having average remanence and average coercive field intensity are selected, and for starters and line voltage motors, magnets having low remanence but very high coercive field intensity or limiting field intensity are selected. This selection is in accordance with the demagnetizing influences arising in operation of the various motors.

By means of the structure proposed in accordance with the invention for commutator machines, which is equally applicable to generators, an advantageous matching of armature cross field and exciter field is thus attained, and as a result a favorable utilization of the volume of the motor is attained, that is, the maximum possible capacity with unchanged volume and/or weight, or a reduction in the dimensions while the capacity remains the same. In the embodiment according to the invention, the saturation phenomena in particular are taken into account, and the possibility is used of changing the values of the remanence and of the coercive field intensity by adding aluminum oxide in a manner known per se such that the best results in terms of excitation flux and demagnetization stability for the particular application are attained. The iron saturation here serves as an adaptation parameter, so as to attain the lowest possible weight per unit of power.

What is claimed is:

1. A commutator machine such as a small direct-current motor, the machine comprising:
   a stator including a magnetic short-circuit element and at least one pair of permanent magnets mounted on said short-circuit element;
   an armature having an armature winding and being rotatably mounted in said stator;
   said permanent magnets being made of at least one ferrite material adjusted to have a remanence ($B_r$) and coercive field intensity ($_JH_C$) above a limiting line in the $B_r/_JH_C$ diagram of 440 mT/260 kA/m and 350 mT/500 kA/m, and that the structure is selected such that at a given outside diameter ($d_M$) of the machine $\leq 120$ mm, the ratio is:

$$\frac{d_A}{p \cdot D_M} \geq 8 \text{ and}$$
$$\frac{p \cdot D_M}{D_R} \leq 1.5,$$

where
$d_A$ is the armature diameter;
p is the number of stator pole pairs;
$D_M$ is the thickness of the magnets; and
$D_R$ is the thickness of the short-circuit element.

2. The comutator machine of claim 1, said permanent magnets having a circular-segmental form.

3. The commutator machine of claim 1, wherein said permanent magnets each have two end portions and a mild portion extending between said end portions, said permanent magnets having a thickness ($D_M$) which is constant over the length of said mid portion.

4. The commutator machine of claim 1, wherein said one ferrite material is adjusted by adding aluminum oxide.

5. The commutator machine of claim 4, wherein said aluminum oxide is added in an amount of up to 6% by weight.

* * * * *